United States Patent
Lai et al.

(10) Patent No.: US 7,002,073 B2
(45) Date of Patent: Feb. 21, 2006

(54) LATCHING ASSEMBLY FOR A REMOVABLE COVER OF A PORTABLE ELECTRONIC DEVICE

(75) Inventors: Can-Ming Lai, Shenzhen (CN); Chia-Hua Chen, Tu-Cheng (TW); Jiang-Yuan He, Shenzhen (CN); De-Lin Li, Shenzhen (CN)

(73) Assignee: FIH Co., Ltd., (TW)

( * ) Notice: Subject to any disclaimer, the term of this patent is extended or adjusted under 35 U.S.C. 154(b) by 0 days.

(21) Appl. No.: 10/970,035

(22) Filed: Oct. 21, 2004

(65) Prior Publication Data
US 2005/0183876 A1 Aug. 25, 2005

(30) Foreign Application Priority Data
Feb. 20, 2004 (TW) .............................. 93202447 U

(51) Int. Cl.
*H02G 3/08* (2006.01)

(52) U.S. Cl. .................... 174/50; 174/66; 174/52.1; 379/433.11; 379/428.01; 455/90.3

(58) Field of Classification Search ............... 174/50, 174/17 R, 52.1, 67, 52.2, 53, 66; 220/3.2, 220/3.8; 379/433.11, 434, 428.01; 455/550, 455/90.3, 575.1, 575.8; 361/683, 747, 801, 361/815, 759, 726, 814
See application file for complete search history.

(56) References Cited

U.S. PATENT DOCUMENTS

| 5,848,152 | A | | 12/1998 | Slipy et al. |
| 5,955,700 | A | * | 9/1999 | Slipy et al. .................... 174/50 |
| 5,982,881 | A | * | 11/1999 | Mischenko ............ 379/433.11 |
| 2002/0002059 | A1 | * | 1/2002 | Johnson |
| 2004/0266498 | A1 | * | 12/2004 | Quin et al. |
| 2005/0009588 | A1 | * | 1/2005 | Qin et al. |
| 2005/0037717 | A1 | * | 2/2005 | Oin et al. |

* cited by examiner

*Primary Examiner*—Angel R. Estrada
(74) *Attorney, Agent, or Firm*—Morris Manning & Martin; Tim Tingkang Xia, Esq.

(57) ABSTRACT

A portable electronic device includes a removable panel (10) defining a first latching hole (122) therein, a knob (30), and a base cover (40). The knob includes an operating portion (31) and a shaft portion (32). A catch (321) extends from the shaft portion. The shaft portion is rotatably received in the first latching hole, with the operation portion being above an upper surface of the removable panel, and the catch being below a lower surface of the removable panel. A second latching hole (450) and a latching hatch (454) are defined in the base cover. The removable panel is attached to the base cover by way of the shaft portion of the knob being inserted into the second latching hole with the catch being received through the latching hatch, and the operating portion of the knob then being rotated so that the catch is engaged below the base cover.

23 Claims, 7 Drawing Sheets

LATCHING ASSEMBLY FOR A REMOVABLE COVER OF A PORTABLE ELECTRONIC DEVICE

CROSS-REFERENCE TO RELATED APPLICATIONS

This application is related to a copending U.S. patent application entitled "LATCHING ASSEMBLY FOR A REMOVABLE COVER OF A PORTABLE ELECTRONIC DEVICE", filed with the same assignee as the instant application on Oct. 21, 2004 with the application Ser. No. 10/970,812. The disclosure of the above identified application is incorporated herein by reference.

BACKGROUND OF THE INVENTION

1. Field of the Invention

The present invention generally relates to portable electronic devices having removable panels, and more particularly to a latching assembly for detachably securing a removable panel to a portable electronic device.

2. Prior Art

Portable electronic devices, such as mobile phones and personal digital assistants, have become widely accepted all around the world. The aesthetic appearance of individual portable electronic devices has become an important requirement of many consumers. Consumers desire different appearances to satisfy their personal tastes and preferences. Thus portable electronic devices with changeable panels are especially popular.

A conventional communication device enclosure with a changeable panel is described in U.S. Pat. No. 5,848,152. The communication device includes a housing and a panel. One or more tabs extend from a periphery of the panel, and one or more slots corresponding to the tabs are defined in a periphery of the housing. Referring to FIG. 8, a latch pin 202 extends from an inner surface of the panel, and a latch keeper 204 is defined in a rear of the housing. A first aperture 206 and a second aperture 208 are defined in the latch keeper 204, with the apertures 206, 208 being in communication with each other. When the latch pin 202 is in the first aperture 206, the panel can be released from the housing, and when the latch pin 202 is in the second aperture 208, the panel is locked on the housing. The latch keeper 204 is forcibly slid using a special tool. In assembly, the tabs of the panel are inserted into the slots of the housing, the latch pin 202 is inserted into the first aperture 206 of the latch keeper 204, and then the latch keeper 204 is slid so that the latch pin 202 enters the second aperture 208 and thereby locks the panel on the housing. In disassembly, the latch keeper 204 is slid so that the latch pin 202 enters the first aperture 206, and then the tabs of the panel are disengaged from the slots of the housing. The panel is thus removed from the housing.

However, a user needs a special tool in order to release or to lock the panel. It is not convenient to change the panel. Moreover, the latch pin is easily disengaged from the locked position when the mobile phone is jarred or dropped.

SUMMARY OF THE INVENTION

Accordingly, an object of the present invention is to provide a latching assembly for a removable panel of a portable electronic device, the latching assembly having a relatively simple configuration which can firmly attach the removable panel to a base cover of the portable electronic device and allow easy detachment of the removable panel from the base cover.

To achieve the above-mentioned object, a portable electronic device includes a removable panel defining a first latching hole therein, a knob, and a base cover. The knob includes an operating portion and a shaft portion. A catch extends from a distal end of the shaft portion. The shaft portion is rotatably received in the first latching hole, with the operation portion being above an upper surface of the removable panel, and the catch being below a lower surface of the removable panel. A second latching hole and a latching hatch communicating with the second latching hole are defined in the base cover. The latching hatch corresponds to the catch. The removable panel is attached to the base cover by way of the shaft portion of the knob being inserted into the second latching hole with the catch of the knob being received through the latching hatch, and the operating portion of the knob then being rotated so that the catch of the knob is engaged below the base cover.

Other objects, advantages and novel features of the invention will become more apparent from the following detailed description when taken in conjunction with the accompanying drawings, in which:

DETAILED DESCRIPTION OF THE INVENTION

Figure 1:
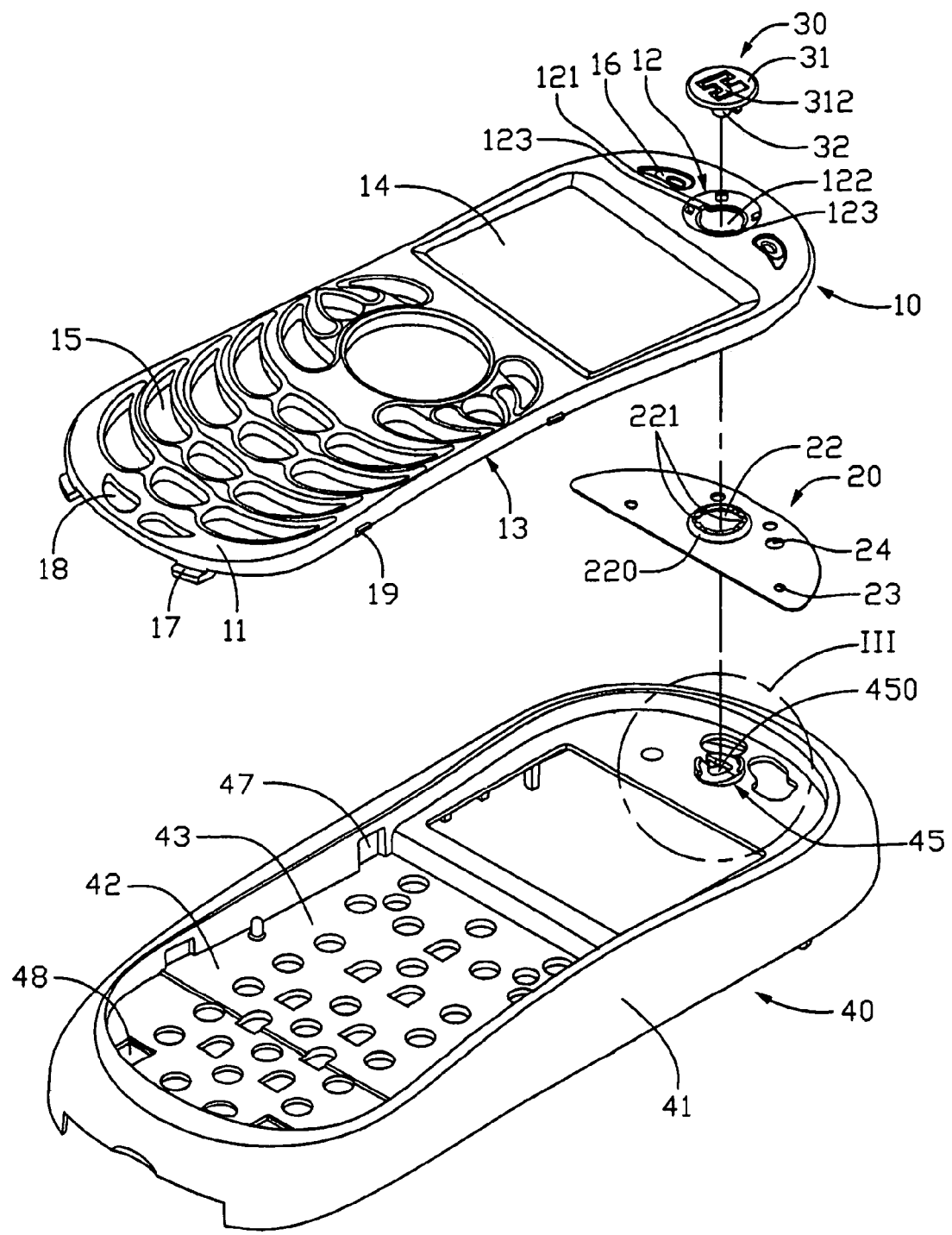
FIG. 1 is an exploded, isometric view of an enclosure for a mobile phone in accordance with the present invention.
Figure 2:
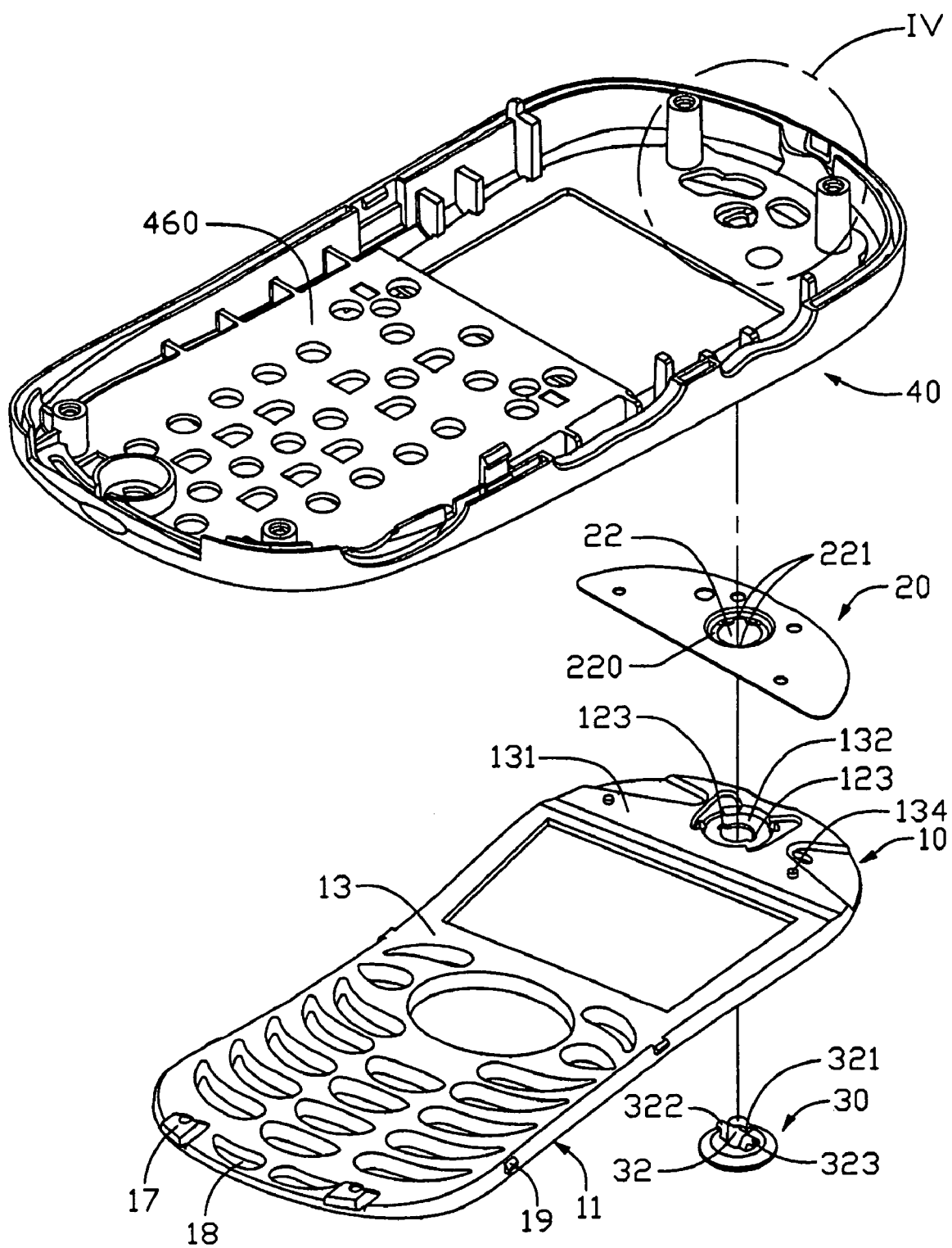
FIG. 2 is an inverted view of FIG. 1.
Figure 3:
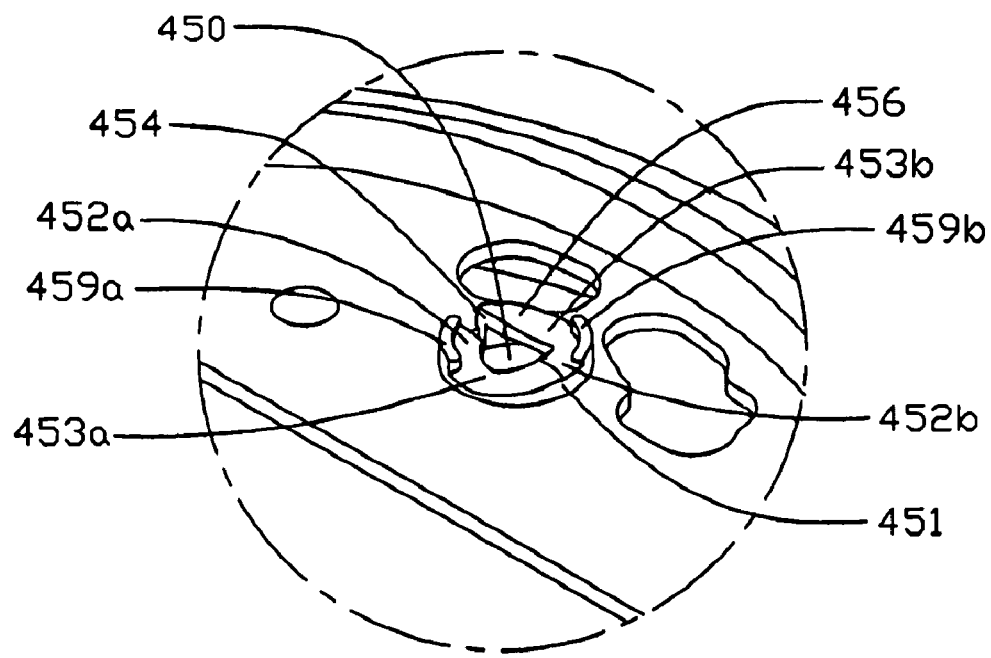
FIG. 3 is an enlarged view of a circled portion III of FIG. 1.
Figure 4:
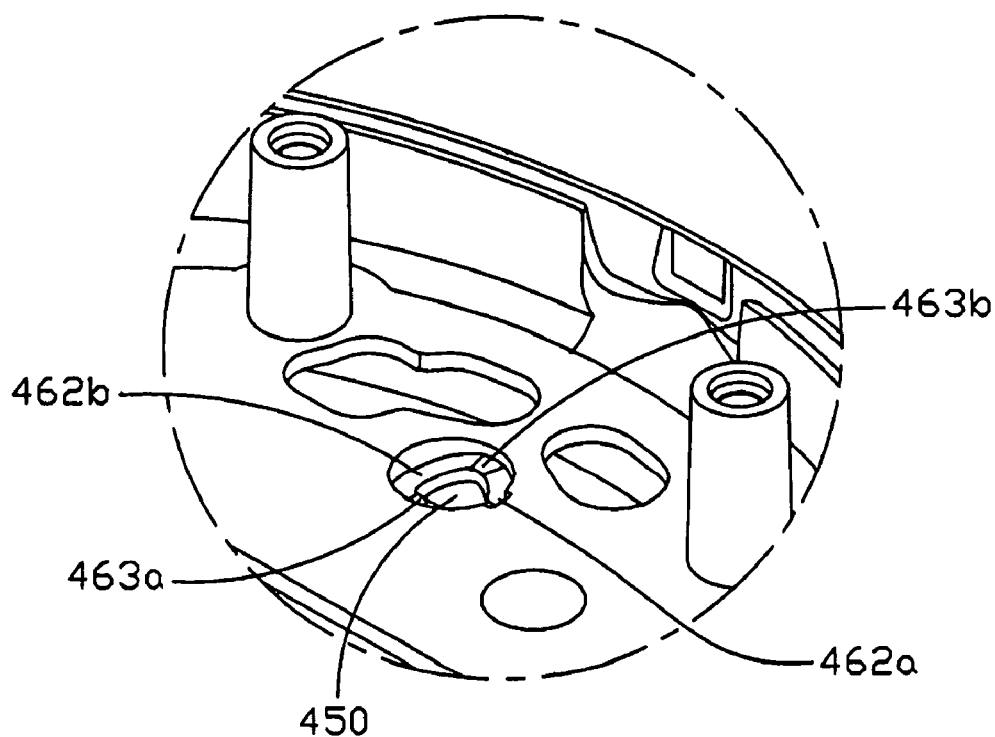
FIG. 4 is an enlarged view of a circled portion IV of FIG. 2.
Figure 5:
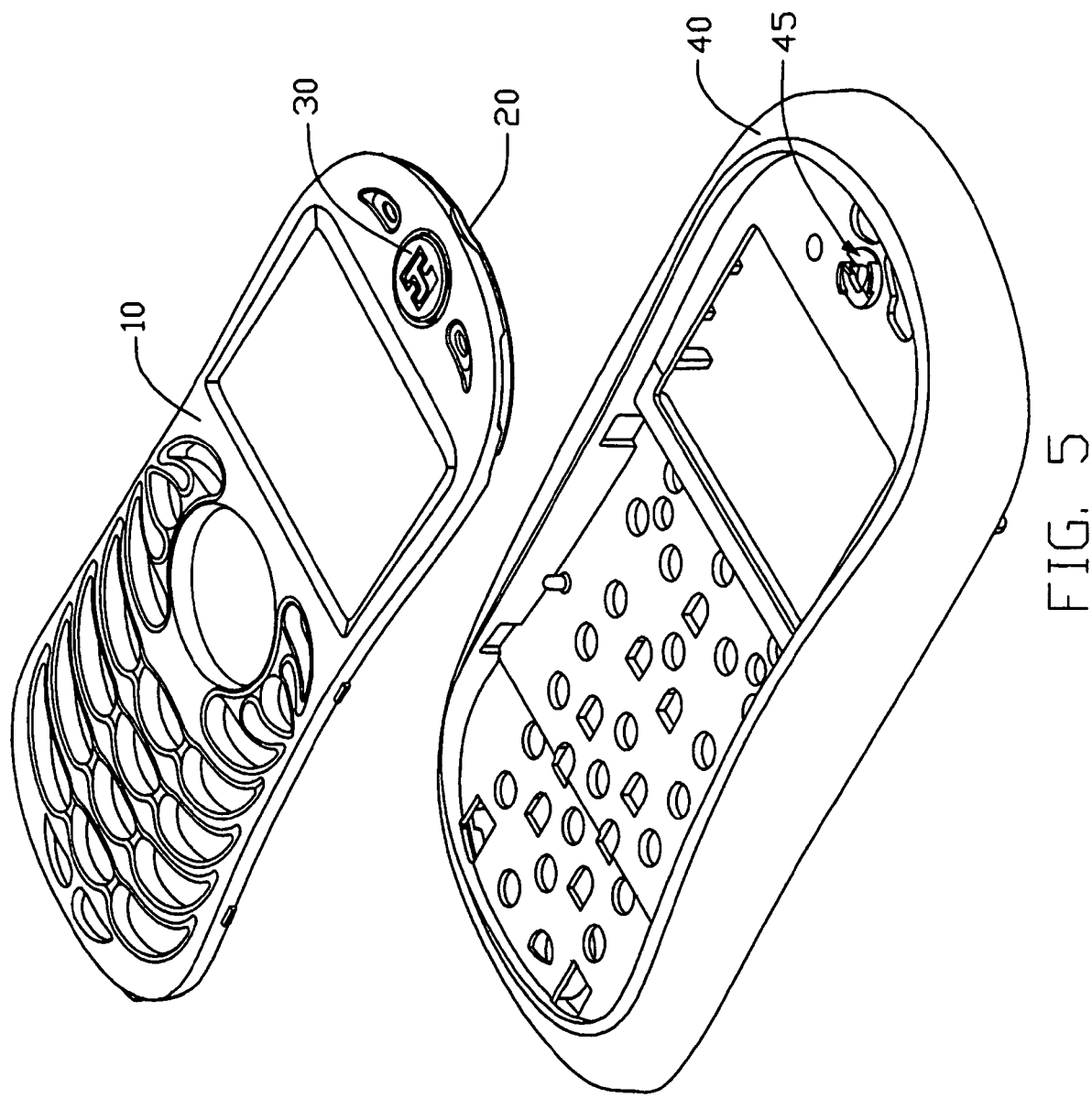
FIG. 5 is a partly assembled view of FIG. 1, but viewed from another aspect.
Figure 6:
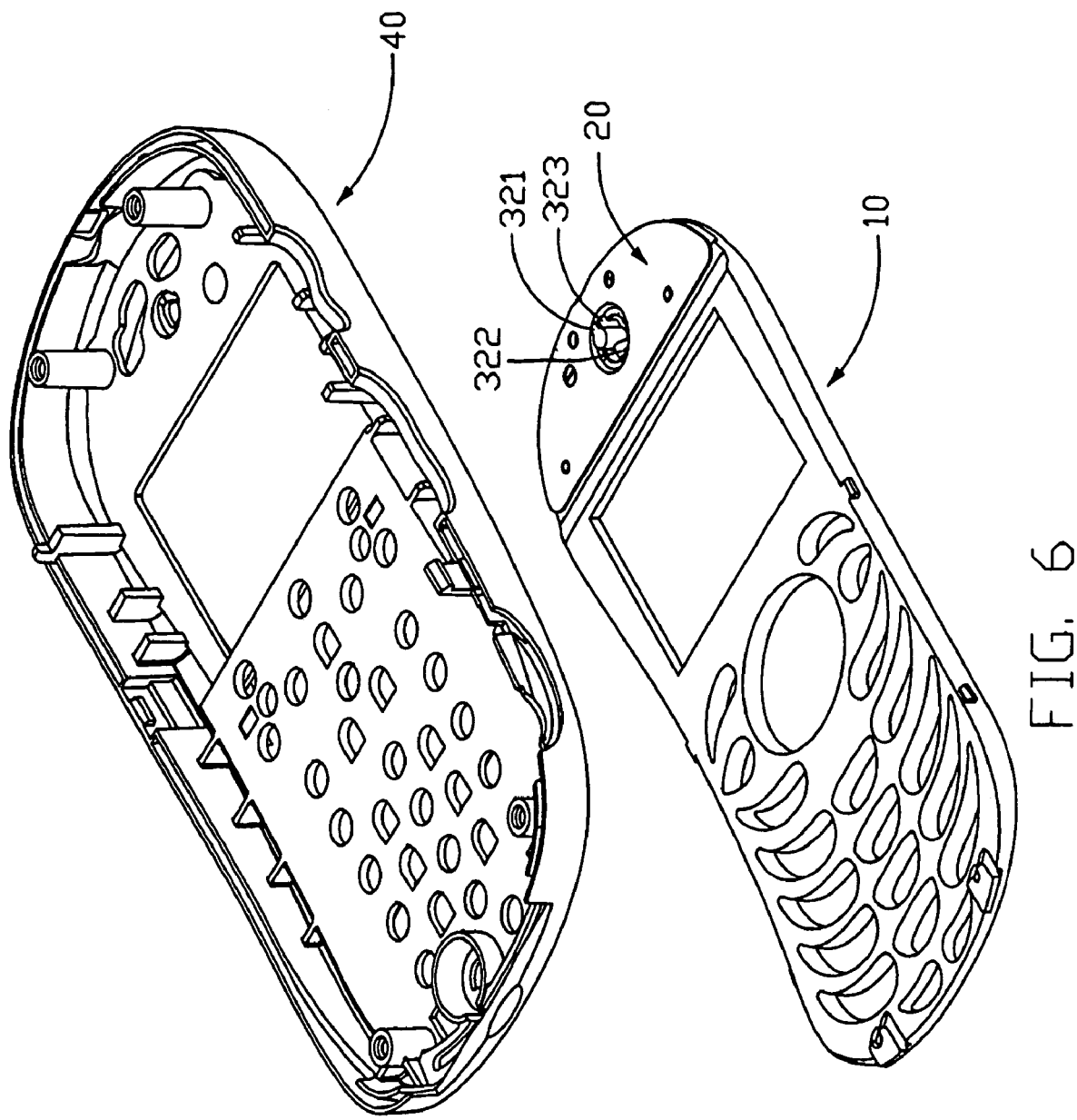
FIG. 6 is an inverted view of FIG. 5.
Figure 7:
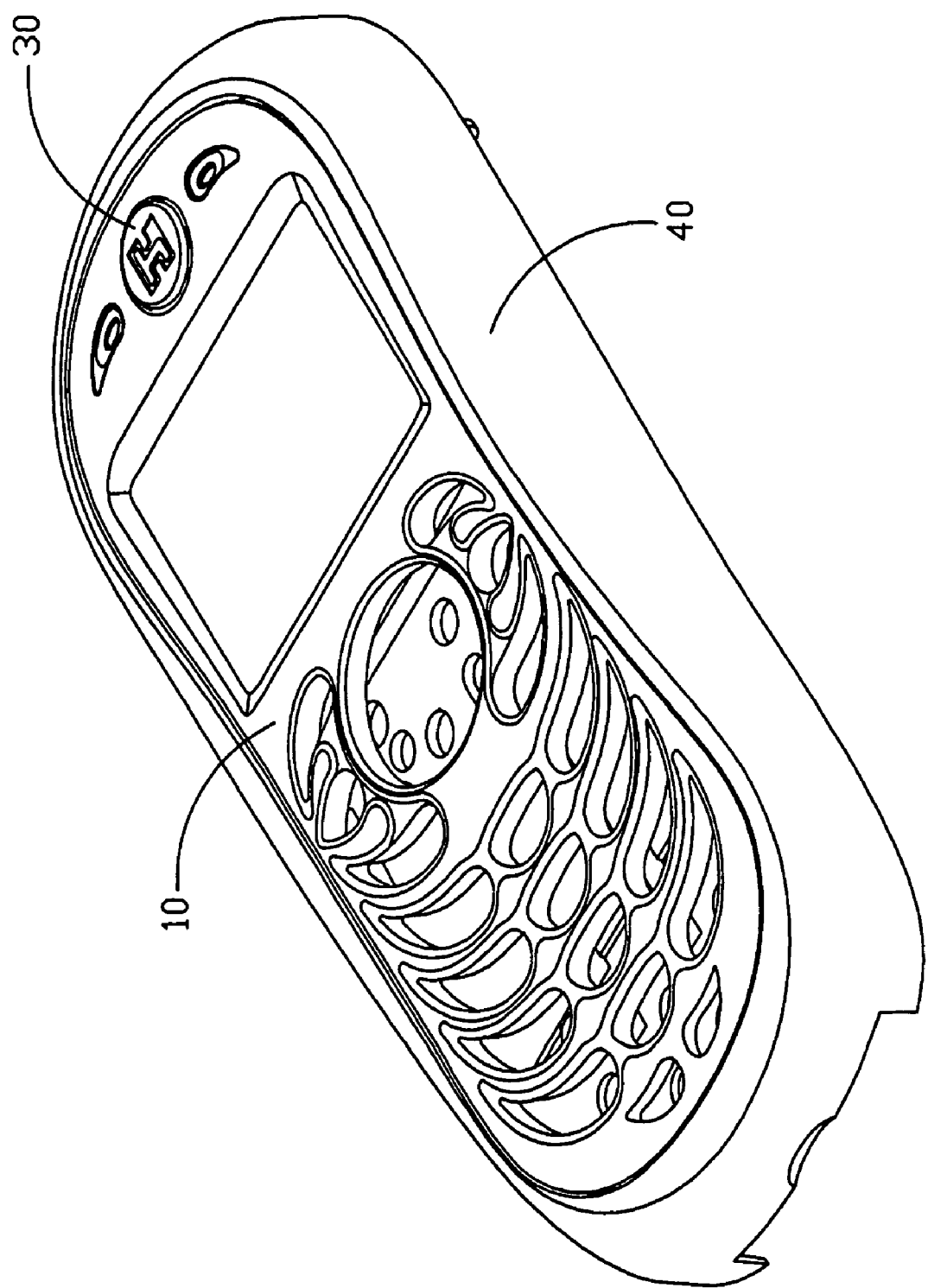
FIG. 7 is a fully assembled view of FIG. 1.
Figure 8:
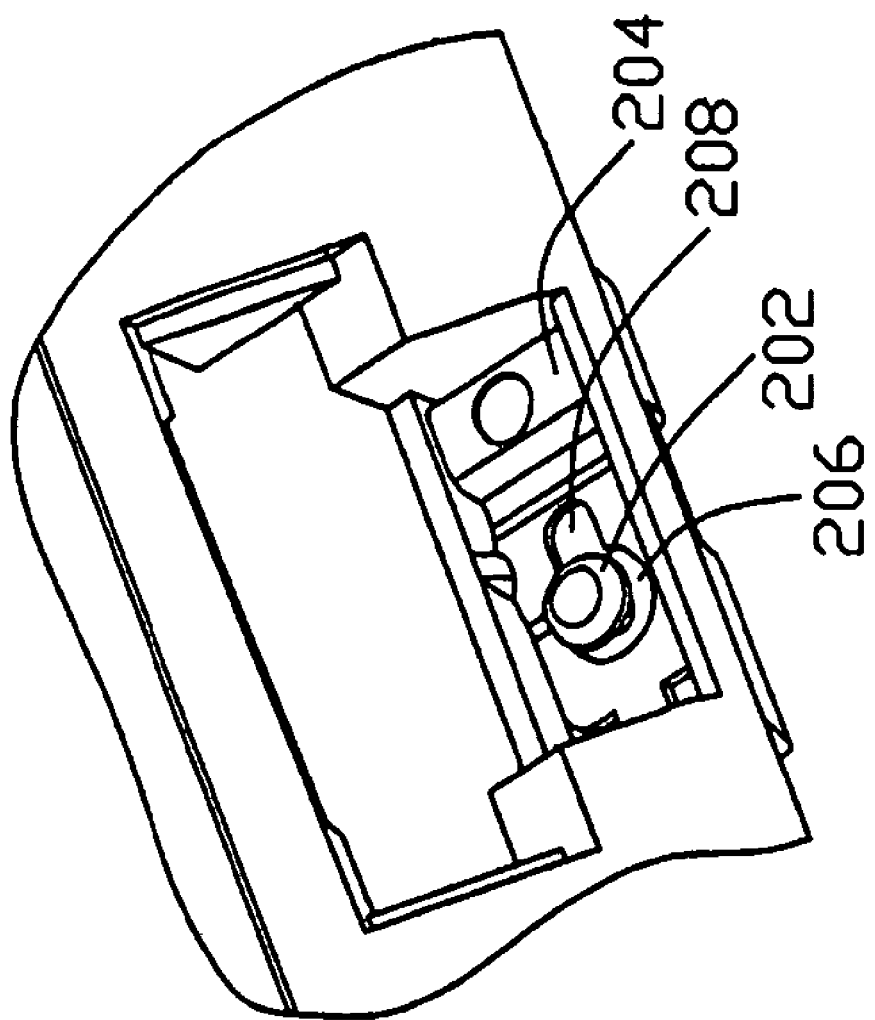
FIG. 8 is an isometric view of part of an end of an enclosure for a mobile phone of the prior art, showing a latch pin and a latch keeper thereof.

A portable electronic device in accordance with the present invention pertains to mobile phones, PDAs (Personal Digital Assistants), and like apparatuses. The present invention will be described as being embodied in a mobile phone as an illustrative example, with reference to the drawings, as follows:

Referring to FIGS. 1–2, an enclosure for a mobile phone includes a removable panel 10, a latching plate 20, a knob 30 and a base cover 40. The knob 30 is mounted in the removable panel 10 by the latching plate 20. The removable panel 10 is attached on the base cover 40 and firmly retained thereon.

The removable panel 10 includes a mounting portion 12 located in a first end thereof, an upper surface 11, a lower surface 13, a pair of detents 19 located on each of opposite long sides thereof, and two latches 17 extending from a second end thereof opposite to the first end. The removable panel 10 further includes a plurality of microphone apertures 18 located in the second end thereof, a plurality of speaker apertures 16 adjacent the mounting portion 12, a display window 14 adjacent the speaker apertures 16, and a plurality of keyholes 15 between the display window 14 and the microphone apertures 18.

The mounting portion 12 includes a circular recess 121 defined at the upper surface 11, a circular first latching hole 122 defined below the circular recess 121, and two first inserting holes 123 defined at opposite sides of a peripheral edge of the first latching hole 122 respectively. A concave portion 131 is formed at the lower surface 13 of the first end of the removable panel 10, a shape of the concave portion 131 corresponding to a shape of the latching plate 20. A depression portion 132 is formed in the concave portion 131, surrounding the first latching hole 122. Two positioning pins 134 protrude from the concave portion 131 near respective opposite edges of the removable panel 10. The positioning pins 134 are used to secure the latching plate 20 to the concave portion 131 of the removable panel 10. It is to be understood that the position of the mounting portion 12 can be varied to any other suitable location on the removable panel 10 of the mobile phone.

The latching plate 20 includes an annular raised flange 220 in a middle thereof. The raised flange 220 defines a circular third latching hole 22 therewithin, corresponding to the first latching hole 122. Two opposite third inserting holes 221 are defined in the raised flange 220. The third inserting holes 221 are oriented obliquely to the first inserting holes 123, in order to secure the knob 30 in the removable panel 10. Two positioning holes 23 are defined near respective opposite edges of the latching plate 20, for receiving the positioning pins 134. The latching plate 20 also defines a plurality of acoustic holes 24 therein. The latching plate 20 is attached on the concave portion 131 of the removable panel 10, with the positioning pins 134 being received in the positioning holes 23. The latching plate 20 can secure the knob 30 in the removable plate 10 and shield electronic magnetic interference ("EMI").

The knob 30 includes an operating portion 31 and a shaft portion 32. The operating portion 31 defines an H-shaped groove 312 in a topmost part thereof, for facilitating operation. The shaft portion 32 is cylindrical, and extends downwardly from the operating portion 31. A catch 321 extends from a distal end of the shaft portion 32. Two opposite latching members 322, 323 protrude from an upper part of the shaft portion 32. The catch 321 is generally coplanar with the latching members 322, 323, with a predetermined distance separating the catch 321 from the latching member 323.

Referring to FIGS. 1–4, the base cover 40 includes a peripheral sidewall 41 and a bottom wall 42. The sidewall 41 and the bottom wall 42 cooperatively form a shallow compartment 43 in an upper portion of the base cover 40. The sidewall 41 and the bottom wall 42 also cooperatively form a receiving space 460 in a lower portion of the base cover 40, for receiving various elements of the mobile phone such as a keypad and a display. A protruding latching portion 45 is formed on a first end of the bottom wall 42. The latching portion 45 includes an upwardly protruding circumferential wall 451, and a generally annular, undulating latching wall 456 surrounded by and perpendicularly connecting with the circumferential wall 451. The latching wall 456 includes two generally opposite crests 452a, 452b, and two generally opposite troughs 453a, 453b between the crests 452a, 452b. A second latching hole 450 is defined in a middle of the latching wall 456. A latching hatch 454 is defined in one side of the latching portion 45 adjacent the crest 452a, the latching hatch 454 being in communication with the second latching hole 450. A thickness of the latching wall 456 is less than the distance between the catch 321 and the latching member 323. Two opposite blocking ridges 459a, 459b extend from an outer edge portion of the latching wall 456, respectively ranging from the crests 452a, 452b counterclockwise to the troughs 453a, 453b. A pair of troughs 462a, 462b is defined in an underside of the latching portion 45, corresponding to the crests 452a, 452b respectively. A pair of crests 463a, 463b is defined at the underside of the latching portion 45 between the troughs 462a, 462b, corresponding to the troughs 453a, 453b respectively. A pair of detent slots 47 is defined in each of opposite long inside portions of the sidewall 41, corresponding to the detents 19 of the removable panel 12. Two latch slots 48 are defined in a second end of the bottom wall 42, corresponding to the latches 17 of the removable panel 10. It is to be understood that the number of the latches 17 and the number of the latch slots 48 can be varied according to need.

In assembly, firstly, the knob 30 is attached in the removable panel 10 by the latching plate 20 as follows. The knob 30 is rotated in order that the latching members 322, 323 thereof are respectively received through the first inserting holes 123, with the operating portion 31 protruding out from the circular recess 121 of the removable panel 10. The knob 30 is rotated again so that the latching members 322, 323 thereof are respectively above the third inserting holes 221 of the latching plate 20. The positioning holes 23 of the latching plate 20 receive the positioning pins 134 of the removable panel 10, with the latching members 322, 323 being received through the third inserting holes 221. The positioning pins 134 are melted to secure the latching plate 20 on the removable panel 10. In this position, the latching members 322, 323 and the catch 321 are received in the third latching hole 22 and the third inserting holes 221, such that the knob 30 is secured in the removable panel 10. For the sake of simplicity, the combined removable panel 10, latching plate 20 and knob 30 is hereinafter simply referred to as the removable panel 10.

Then the removable panel 10 is attached to the base cover 40. The latches 17 of the removable panel 10 are inserted into the latch slots 48 of the base cover 40. The detents 19 are received in the detent slots 47. At this time, the mounting portion 12 of the removable panel 10 is positioned upon the latching portion 45 of the base cover 40, and the removable panel 10 is substantially received in the shallow compartment 43 of the base cover 40. The knob 30 is rotated until the catch 321 is above the latching hatch 454. The knob 30 is pressed down slightly, so that the catch 321 is below the latching wall 456, and the latching members 322, 323 are above the latching wall 456. The knob 30 is rotated about 90 degrees clockwise, such that the catch 321 and the latching members 322, 323 respectively slide across bottom and top surfaces of the latching wall 456. When the knob 30 begins to reach the 90 degree position, the catch 321 begins to encounter resistance in the trough 462a as it reaches the crest 463b. Therefore the knob 30 is pressed further down slightly while rotating, so that the catch 321 rides onto the crest 463b. Simultaneously, the latching members 323, 322 are fully received in the troughs 453b, 453a respectively, and are blocked by the blocking ridges 459b, 459a respectively. Thus the catch 321 and the latching members 322, 323 cooperate with the latching portion 45 to secure the removable panel 10 to the base cover 40.

In detaching the removable panel 10 from the base cover 40, the process is substantially the reverse of the above-described assembly process. The knob 30 is rotated counterclockwise about 90 degrees so that the catch 321 reaches the latching hatch 454. In this process, the knob 30 is displaced slightly upwardly so that the operating portion 31 protrudes out from the circular recess 121. Then the knob 30 can be gripped in order to pull the removable panel 10 out from the compartment 331. Further or alternatively, the mobile phone can be inverted in order to take the removable panel 10 out from the compartment 331. The detents 19 of the removable panel 10 are then released from the detent slots 47 of the base cover 40, and the latches 17 of the removable panel 10 are released from the latch slots 48 of the base cover 40.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A portable electronic device, comprising:
   a removable panel defining a first latching hole therein;
   a knob comprising an operating portion and a shaft portion, a catch extending from the shaft portion, wherein the shaft portion is rotatably received in the first latching hole, with the operation portion above an upper surface of the removable panel, and the catch below a lower surface of the removable panel; and
   a base cover, the base cover defining a second latching hole through the base cover and a latching hatch corresponding to the catch, the latching hatch located beside the second latching hole and having inner space facing and communicating with the second latching hole;
   wherein the removable panel is releasably attached to the base cover by way of the shaft portion of the knob being inserted into the second latching hole with the catch of the knob being receivable in the inner space of the latching hatch and movable therealong, and the operating portion of the knob then being rotated so that the catch of the knob is engaged below the base cover.

2. The portable electronic device as claimed in claim 1, wherein two opposite latching members protrude from the shaft portion.

3. The portable electronic device as claimed in claim 2, wherein the catch is generally coplanar with the latching members, with a predetermined distance defined between the catch and a nearest one of the latching members.

4. The portable electronic device as claimed in claim 3, wherein a recess corresponding to the operation portion is defined at an upper surface of the removable panel, and the first latching hole is defined below the recess.

5. The portable electronic device as claimed in claim 4, wherein the removable panel defines two first inserting holes adjacent opposite sides of the first latching hole respectively.

6. The portable electronic device as claimed in claim 5, wherein a concave portion is provided at a lower surface of the removable panel.

7. The portable electronic device as claimed in claim 6, wherein a depression portion is formed in the concave portion, the depression portion surrounding the first latching hole.

8. The portable electronic device as claimed in claim 7, further comprising a latching plate having an inner raised flange, and wherein a concave portion is provided at a lower surface of the removable panel, with the latching plate being engaged in the concave portion.

9. The portable electronic device as claimed in claim 8, wherein the raised flange defines a third latching hole therewithin corresponding to the first latching hole, and two opposite third inserting holes orienting obliquely to the first inserting holes.

10. The portable electronic device as claimed in claim 9, wherein a latching portion is provided on the bottom wall of the base cover.

11. The portable electronic device as claimed in claim 10, wherein the latching portion comprises an upwardly protruding circumferential wall, and an undulating latching wall surrounded by and perpendicularly connecting with the circumferential wall, and the second latching hole is defined in a middle of the latching wall.

12. The portable electronic device as claimed in claim 11, wherein the undulating latching wall comprises two opposite first crests, and two opposite first troughs between the first crests.

13. The portable electronic device as claimed in claim 12, wherein the latching hatch is defined in one side of the latching portion adjacent one of the crests.

14. The portable electronic device as claimed in claim 13, wherein a thickness of the latching wall is less than the distance between the catch and said nearest one of the latching members.

15. The portable electronic device as claimed in claim 14, wherein two opposite blocking ridges respectively extend from an outer edge portion of the latching wall, the blocking ridges ranging from respective of the first crests to respective of the first troughs.

16. The portable electronic device as claimed in claim 15, wherein a pair of second troughs is defined in an underside of the latching portion corresponding to the first crests respectively, and a pair of second crests is defined at the underside of the latching portion between the second troughs, corresponding to the first troughs respectively.

17. The portable electronic device as claimed in claim 1, wherein the base cover comprises a peripheral sidewall and a bottom wall, the sidewall and the bottom wall cooperatively forming a compartment in an upper portion of the base cover.

18. The portable electronic device as claimed in claim 17, wherein at least one detent is provided on at least one of opposite long sides of the removable panel, and at least one of opposite long side portions of the sidewall of the base cover defines at least one detent slot corresponding to the at least one detent.

19. The portable electronic device as claimed in claim 18, wherein at least one latch extends from an end of the removable panel, and an end of the bottom wail of the base cover defines at least one latch slot corresponding to the at least one latch.

20. A portable electronic device, comprising:
   a removable panel defining a first latching hole therein;
   a knob comprising an operating portion and a shaft portion, a catch extending from an end of the shaft portion, and a latching member extending from the shaft portion, the latching member being aligned with the catch and spaced a predetermined distance therefrom, wherein the shaft portion is rotatably received in the first latching hole, with the operation portion above an upper surface of the removable panel; and
   a base cover comprising a latching portion at an end thereof, the latching portion comprising an undulating latching wall defining a second latching bole therein, the latching portion defining a latching hatch in communication with the second latching hole, the latching hatch corresponding to the catch;
   wherein the removable panel is removably attached to the base cover by way of the shaft portion of the knob being inserted into the second latching hole such that the catch is below the latching wall and the latching member is above the latching wait and the operating portion then being rotated so that the catch and the latching member slide along opposite lower and upper faces of the latching wall.

21. The portable electronic device as claimed in claim 20, further comprising a latching plate securing the knob on the removable panel, the latching plate defining a third latching hole corresponding to the first and second latching holes.

22. A latching assembly for a removable panel of a portable electronic device, comprising:
- a knob rotabably attached to said removable panel and having a shaft portion extending toward said portable electronic device; and
- a latching portion formed in said portable electronic device facing said removable panel and reachable to said shaft portion of said knob, said latching portion comprising a latching wall declining gradually away from a final assembly position of said removable panel with respect to said portable electronic device, said latching wall capable of being sandwiched by said shaft portion of said knob so as to contribute to movement of said removable panel toward said final assembly position thereof in case of engagement of said shaft portion of said knob and said latching wail and rotation of said shaft portion along said latching wall.

23. The latching assembly as claimed in claim 22, wherein said shaft portion comprises a catch formed at an end thereof and a latching member spaced from and next to said catch so as to sandwich said latching wall between said catch and said latching member.

* * * * *